(12) United States Patent
Lee (10) Patent No.: US 6,987,380 B1
(45) Date of Patent: Jan. 17, 2006

(54) TIME-BASED CURRENT CONTROL IN SWITCHING REGULATORS

(75) Inventor: Damon Lee, San Jose, CA (US)

(73) Assignee: Linear Technology Corporation, Milpitas, CA (US)

(*) Notice: Subject to any disclaimer, the term of this patent is extended or adjusted under 35 U.S.C. 154(b) by 284 days.

(21) Appl. No.: 10/011,504

(22) Filed: Nov. 6, 2001

(51) Int. Cl.
G05F 1/445 (2006.01)

(52) U.S. Cl. ..................... 323/285; 323/288

(58) Field of Classification Search ........... 323/266, 323/282, 283, 284, 285, 288, 290, 351; 327/110, 327/419, 574, 581
See application file for complete search history.

(56) References Cited

U.S. PATENT DOCUMENTS

| | | | |
|---|---|---|---|
| 5,912,552 A | | 6/1999 | Tateishi ..................... 323/285 |
| 6,020,729 A | * | 2/2000 | Stratakos et al. ........... 323/283 |
| 6,069,471 A | * | 5/2000 | Nguyen ..................... 323/271 |
| 6,222,356 B1 | * | 4/2001 | Taghizadeh-Kaschani .. 323/288 |
| 6,380,720 B1 | * | 4/2002 | Cain et al. .................. 323/268 |
| 6,381,159 B2 | * | 4/2002 | Oknaian et al. ............. 363/98 |
| 6,456,050 B1 | * | 9/2002 | Agiman ..................... 323/282 |
| 6,680,604 B2 | * | 1/2004 | Muratov et al. ........... 323/285 |

OTHER PUBLICATIONS

"–5V/–12V/–15V or Adjustable, High-Efficiency, Low IQ Inverting DC-DC Controllers", MAXIM, pp. 1-16, 1994.
"High Efficiency Step-Down and Inverting DC/DC Converter", Linear Technology—LTC 1174, LTC1174-3.3/LTC1174-5, pp. 1-16, no date.

* cited by examiner

Primary Examiner—Gary L Laxton
(74) Attorney, Agent, or Firm—Fish & Neave IP Group of Ropes & Gray LLP; Robert W. Morris; Jeffrey D. Mullen (57) ABSTRACT

Control circuits that employ time-based current control methods for switching voltage regulators are provided. The control circuit includes a current estimation circuit and optionally, a transfer function circuit. The current estimation circuit generates estimates of regulator output current as function of switch period for use as a threshold indicative of peak current limit. This arrangement eliminates the need for error amplifiers to provide effective current mode control. The absence of error amplifiers allows fabrication of switching regulators on smaller die areas and provides switching regulators with reduced power consumption.

31 Claims, 8 Drawing Sheets

TIME-BASED CURRENT CONTROL IN SWITCHING REGULATORS

BACKGROUND OF THE INVENTION

The present invention relates to switching regulator circuits. More particularly, the present invention relates to circuits and methods for regulating output voltage based on approximations of load current.

The purpose of a voltage regulator is to provide a predetermined and substantially constant output voltage to a load from a poorly-specified and fluctuating voltage source. One type of voltage regulator commonly used to accomplish this task is a switching voltage regulator. Switching voltage regulators are typically arranged to have a switching element, such as a power transistor, coupled between the voltage source and the load. The switching regulator controls the voltage across the load by turning the switching element ON and OFF so current passes through it and into an inductor in the form of discrete current pulses. The inductor and an output capacitor then convert these current pulses into a substantially steady load current so that the load voltage is regulated.

To generate a stream of current pulses, switching regulators include control circuitry that commands the switching element ON and OFF. The duty cycle of the switching element (i.e., the amount of time the switching element is ON compared to the period of an ON/OFF cycle), which controls the flow of current into the load, can be varied by a variety of methods. Pulse width modulation (PWM), for example, can be used to vary the duty cycle of the switching element by fixing the pulse stream frequency and varying the ON (or OFF) time of each current pulse. Another commonly employed technique is pulse frequency modulation (PFM), in which the ON or OFF time of each current pulse is fixed and the frequency of the pulse stream is varied.

The abrupt switching and accompanying discharge of energy stored in inductive filter elements typically results in undesirably large ripple voltages at the output of the regulator. This ripple voltage is generally proportional to the product of the equivalent series resistance (ESR) of the filter capacitors and the inductor current. In many instances, the peak inductor current rises to relatively large levels due to the size of the inductor required to accommodate worst-case operating scenarios of the regulator. As a result, a significant amount of ripple may be present on the regulator output.

Ripple voltages may be minimized by using "current mode" type switching regulators. Rather than relying directly on output voltage for control, current-mode switching regulators use a signal indicative of switch current to provide regulation information. For example, a current-mode switching regulator may use peak switch current as the criteria for determining when to modify the switching element duty cycle. Current mode switching regulators often incorporate special circuits designed to reduce current flow and ripple depending on the load. For example, a current-mode switching regulator may use an error amplifier to control the peak, average, or minimum values of regulator output current (i.e., inductor or load current) based on the difference between the output voltage and the desired ideal regulated voltage.

The method of using a single peak current threshold for current mode control, however, may not be satisfactory under a variety of commonly encountered conditions (e.g., at start-up or under low output load currents). Under such conditions, a feedback loop using an error amplifier may not be stable. To avoid feedback instability, some switching regulators operate in one of two modes depending on the magnitude of an error signal, with each mode having a distinct peak current threshold. The use of two distinct peak current thresholds, however, may lead to undesirable subharmonic oscillations with the output current oscillating between the two distinct threshold levels. To avoid this problem, only one distinct peak level is used during normal operation. The dual thresholds are used only during startup or in cases where the output voltage is severely out of regulation. An example of this type of regulator is the LTC1174, manufactured by Linear Technology Corporation, Milpitas, Calif.

Other commercially available switching regulators, such as the MAX774/5/6 series manufactured by Maxim Integrated Products Inc., Sunnyvale, Calif., may also use two distinct peak current threshold levels for current control, albeit differently. With light loads, the first two switch cycles use the lower peak current threshold level in an attempt to regulate the output voltage. If regulation of the output voltage is achieved within two switch cycles, the regulator continues to operate with the lower peak current threshold level. If regulation is not achieved within two cycles, the regulator begins to operate with the higher peak current threshold level. This technique, however, does not always avoid instability in the feedback loop. It also exhibits poor pulse response because the initial pulses are set at low current levels.

In view of the foregoing, it would be desirable to provide switching regulator circuits that have the benefits of current mode control, such as low ripple, and yet provide efficient voltage regulation under a variety of input voltage and output load conditions.

SUMMARY OF THE INVENTION

It is therefore a object of the present invention to provide voltage regulators that have the benefits of current mode control, such as low ripple, and yet provide efficient voltage regulation under a variety of input voltage and output load conditions.

This and other objects of the present invention are accomplished by providing control circuits and methods for switching regulators that employ time-based current control. The control circuit includes a current estimation circuit and optionally, a transfer function circuit. The current estimation circuit generates estimates of regulator output current as function of switch period that are used as a threshold indicative of peak current limit. This arrangement eliminates the need for error amplifiers to provide effective current mode control. The absence of error amplifiers allows fabrication of switching regulators on smaller die areas and provides switching regulators with lower power consumption.

The transfer function circuit may be used to obtain averages of output current estimates or to obtain a particular transfer function relating switch period to output current. By selecting a particular transfer function, a circuit designer may improve or optimize certain performance characteristics of the voltage regulator.

Furthermore, the control circuit of the present invention provides low ripple output signals characteristic of current-mode switching regulators without the use of additional pins or compensation components that may be required for feedback stability when using error amplifiers.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
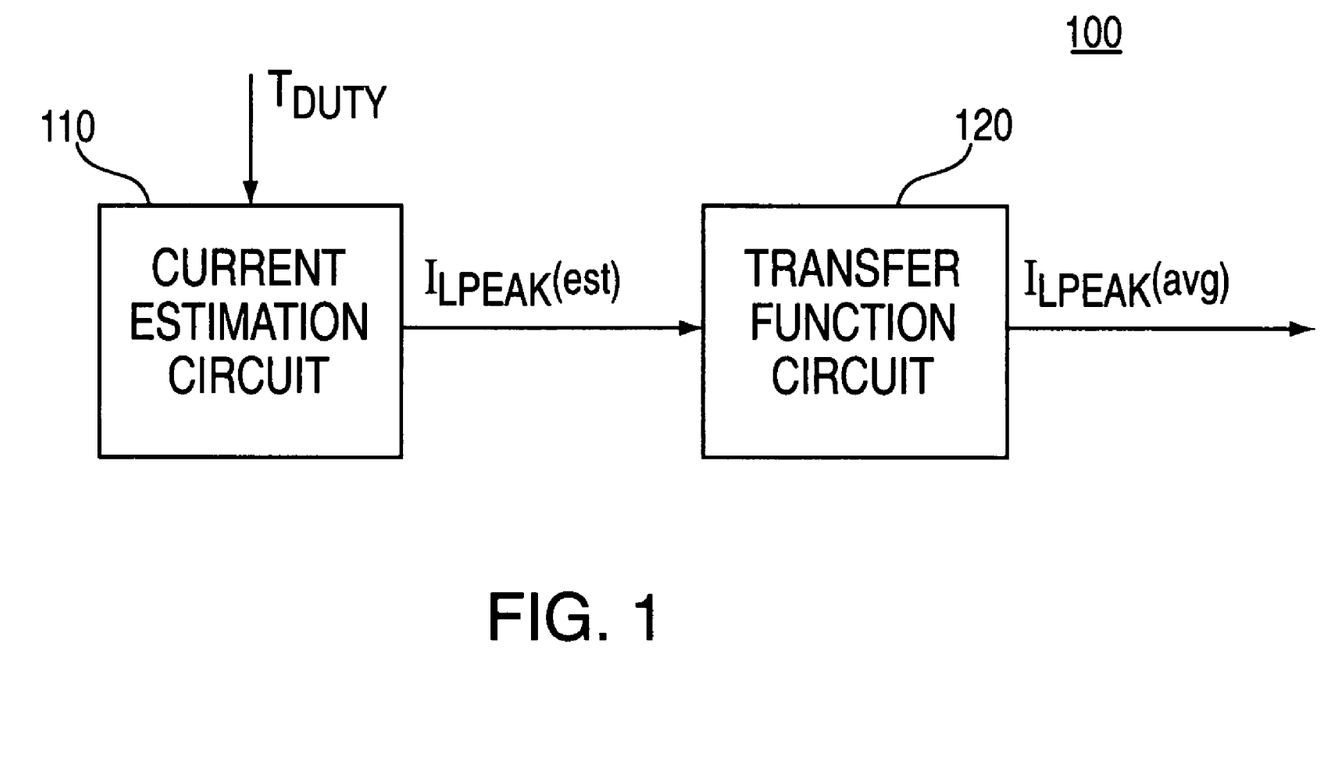
FIG. 1 is an illustrative block diagram of a current control circuit constructed in accordance with the principles of the present invention.

FIG. 1 is an illustrative block diagram of a time-based current control system 100 constructed in accordance with the principles of the present invention that can be used to regulate the output of a switching regulator. System 100 may include two sections: a current estimation circuit 110 and a transfer function circuit 120.

During operation, a signal ($T_{DUTY}$) indicative of the duty cycle of a switching regulator (not shown) is provided to current estimation circuit 110. $T_{DUTY}$ may be, for example, a control signal used to command a switching element in the regulator ON and OFF (or a signal derived therefrom). Estimation circuit 110 generates an output signal $I_{LPEAK}$(est) in response to $T_{DUTY}$ that is an estimation of the switching regulator's peak output current. This estimation may be performed in various ways. One way is to measure the period of $T_{DUTY}$ and make an approximation of output current based on the amount of time the switching element is held ON or OFF. Once this estimate is obtained, it may be used to adjust the regulator's output current to match the load current and thereby provide effective output regulation (discussed in more detail below). This may be done, for example, by using $I_{LPEAK}$(est) as a threshold value that determines when to turn the regulator's switching element ON or OFF.

In some embodiments, it may be desirable to pass $I_{LPEAK}$(est) through transfer function circuit 120 to obtain a certain transfer function from system 100 that relates switch period and regulator current in a particular way. With this configuration, specific performance characteristics may be obtained from the regulator such as reliable high frequency operation, improved stability, or improved bandwidth, etc. It will be appreciated, however, that $I_{LPEAK}$(est) may be used without further processing by transfer function circuit 120 to control the regulator's output.

Figure 2:
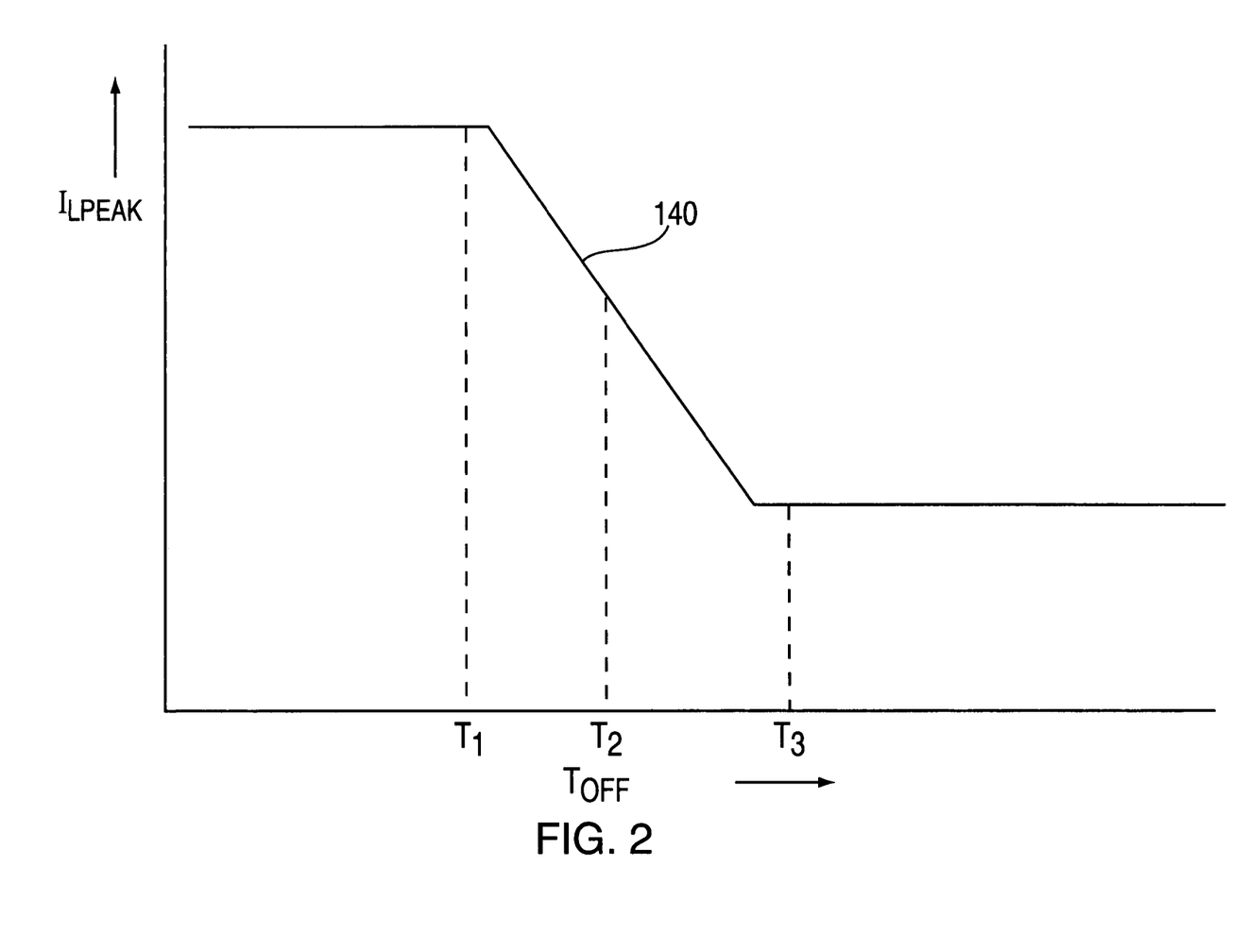
FIG. 2 is a graphical representation of a linear transfer function relating switch OFF-time to peak load current.

In FIG. 2, line 140 represents a linear transfer function which includes terms that are substantially linear. This transfer function is suitable for use with a switching regulator that employs a minimum OFF-time architecture.

Generally speaking, it is desirable to have a linear transfer function to obtain a sufficiently fast frequency response to support current-mode control. As shown in FIG. 2, the value of $I_{LPEAK}$, which may be used to establish the regulators's switching threshold, varies with respect to switch OFF-time. Thus, as the switch OFF-time increases from $T_1$ to $T_2$ to $T_3$, the threshold value at which the regulator ceases to supply current also decreases. Using this transfer function, the regulator's switching point ($I_{LPEAK}$) can be adaptively adjusted to a specific value within a range of values represented by line 140 so that the switching threshold is specifically tailored meet the requirements of a given load. This provides a dramatic improvement over prior art techniques that merely switch back and forth between two static threshold values in an attempt to determine which of the two thresholds more closely approximates the load's need.

Figure 3:
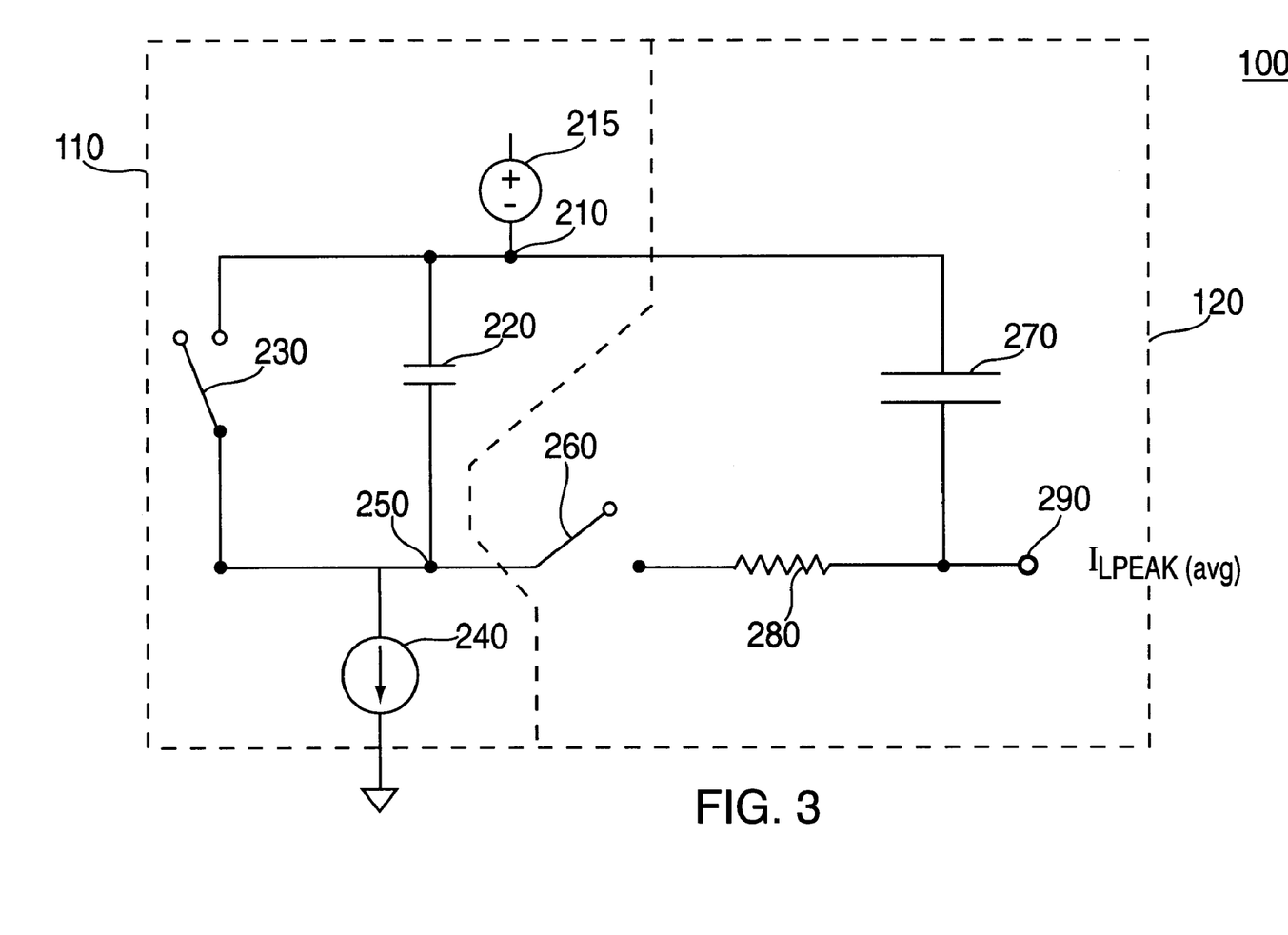
FIG. 3 is a schematic representation of one possible specific implementation of the current control circuit shown in FIG. 1.

FIG. 3 shows a schematic diagram of one possible implementation of current control system 100 that can be used to obtain the linear transfer function shown in FIG. 2. As shown in FIG. 3, system 100 includes capacitors 220 and 270, switches 230 and 260, clamp voltage 215, constant current source 240, node 250, output node 290, and optionally resistor 280.

A clamp voltage 215 (Vc) representing the maximum peak inductor current, $I_{LPEAK}$(max), is applied to circuit 110 at node 210. With this implementation, the estimated peak current threshold, $I_{LPEAK}$(est), of a voltage regulator may be defined as being proportional to the time varying "control" voltage across capacitor 220. Furthermore, the average estimated peak current threshold, $I_{LPEAK}$(avg), may be defined to be proportional to a voltage across capacitor 270.

As shown in FIG. 3, when switch 260 is open, the application of a "clear" signal (which may be derived from $T_{DUTY}$), closes switch 230 and allows node 250 to reach the clamp voltage, Vc, that corresponds to $I_{LPEAK}$(max). Switch 230 is then opened. During a time delay after switch 230 is opened (e.g., a delay equal to minimum OFF-time, $T_{OFF}$(min)), constant current source 240 linearly ramps down the control voltage on capacitor 220 until interrupted by an "update" signal (which also may be derived from $T_{DUTY}$) that closes switch 260. At this point, a voltage representative of $I_{LPEAK}$(est) is present at node 250. Thus, by discharging capacitor 220 at a known rate, and then interrupting the discharge at a point in time proportional to the switching period of the voltage regulator, an estimate of peak current threshold, ($I_{LPEAK}$(est)) may be obtained in the form of a voltage remaining across capacitor 220. As noted above, this value may be used as a threshold value that determines when to turn the regulator's switching element ON or OFF.

If desired, additional processing may be performed on the $I_{LPEAK}$(est) signal to obtain a particular transfer characteristic for system 100. This may be accomplished by adding transfer function circuit 120. For example, if an average of the peak inductor current ($I_{LPEAK}$(avg)) is desired, the transfer function circuit 120 shown in FIG. 3 may be used.

As shown in FIG. 3, transfer function circuit 120 may include capacitor 270 and resistor 280. When switch 260 is closed, capacitor 270 and resistor 280 become electrically active and form a capacitor divider arrangement with capacitor 220. This causes the voltage difference between node 250 and node 290 to be distributed across capacitors 220 and 270. A fraction of the voltage at node 250 representing a time sample of $I_{LPEAK}$(est) is transferred to node 290 and combined with a pre-existing voltage obtained from previous samples. In this manner, the value of $I_{LPEAK}(avg)$, which is proportional to the voltage at node 290, changes in response to the update signal. The new voltage present at node 250 is maintained until another clear signal closes switch 230 again and allows node 250 to reach the clamp voltage, Vc again.

The divider arrangement of capacitors 220 and 270, and resistor 280 provides an updated value of $I_{LPEAK}(avg)$ by effectively generating a weighted average of a time sample of $I_{LPEAK}(est)$ and a prior value of $I_{LPEAK}(avg)$. The sizes of capacitors 220 and 270 determine the relative contributions of $I_{LPEAK}(est)$ and $I_{LPEAK}(avg)$ to the weighted average, and determine the time constants for settling of repeatedly updated $I_{LPEAK}(avg)$ values. Simple, approximately linear, averaging may be obtained when capacitor 270 is much larger (e.g., a factor of ten or more) than capacitor 220. Conversely, if capacitor 270 is much smaller than capacitor 220, only a small contribution of $I_{LPEAK}(est)$ is included in the updated value of $I_{LPEAK}(avg)$. If both capacitors are of comparable size, however, nonlinear averaging (in which the magnitude of $I_{LPEAK}(est)$ relative to the prior value of $I_{LPEAK}(avg)$ determines the contribution of $I_{LPEAK}(est)$ to the average) can be obtained. This nonlinear averaging can be used to obtain an exponentially smooth settling of $I_{LPEAK}(avg)$ values towards an asymptotic value. The presence of resistor 280 in the capacitor divider arrangement enables the exponentially smooth settling using smaller capacitor sizes but makes the averaging dependent on the duration of the update signal.

In one embodiment of the present invention, updated values of $I_{LPEAK}(avg)$ can be used to define the peak current thresholds used in a switching regulator (not shown). In this embodiment, the time constants for the settling of $I_{LPEAK}(avg)$ values determine the response of output current to variations in load. This time constant may be roughly equivalent to the RC time constant in prior art current-mode switching regulators.

Figure 4A:
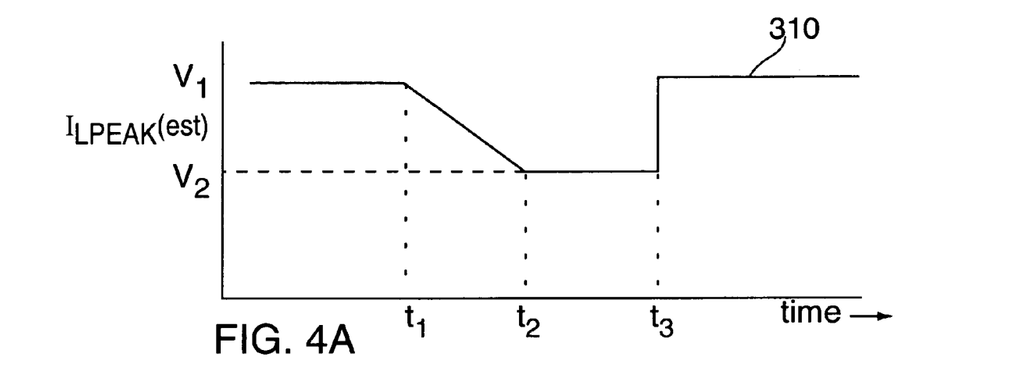
FIGS. 4A–4C are timing diagrams showing the estimated and updated peak current thresholds generated by the circuit of FIG. 3.

FIG. 4A is a graph illustrating the response of the $I_{LPEAK}(est)$ signal that may be obtained with current estimation circuit 110. Waveform 310 shows $I_{LPEAK}(est)$ initially constant at its maximum value (i.e., level $V_1$) proportional to the clamp voltage Vc, and then being linearly ramped down from time $t_1$ until an update signal is applied at time $t_2$. After the update signal is applied, $I_{LPEAK}(est)$ remains constant (i.e., at level $V_2$) until time $t_3$, at which a clear signal is applied to switch 230 (FIG. 3). $I_{LPEAK}(est)$ then reverts back to $V_1$.

Figure 4B:
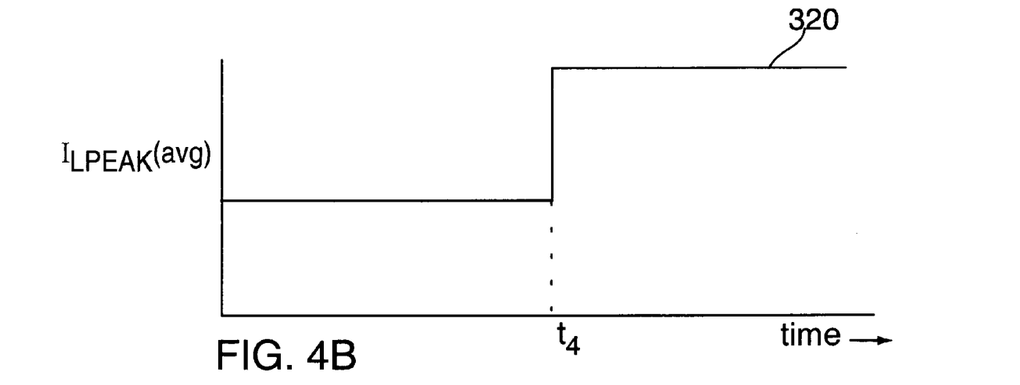
Figure 4C:
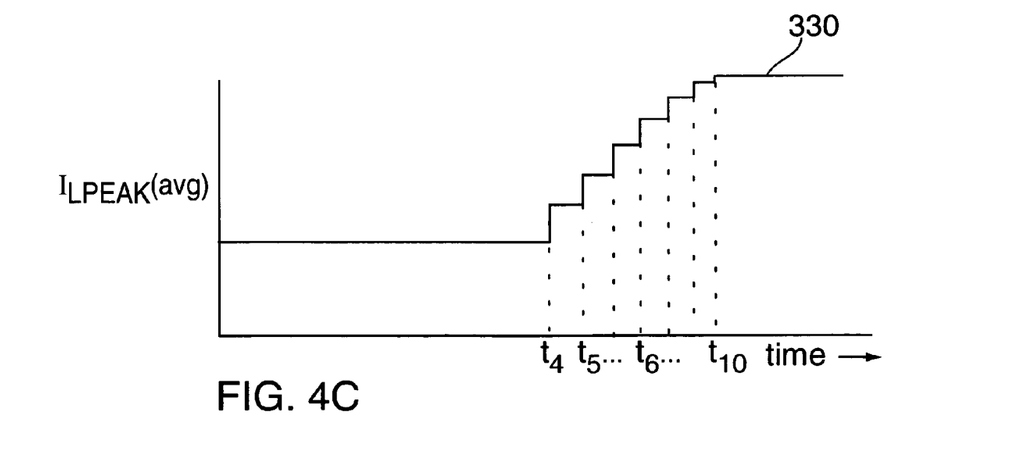

FIGS. 4B and 4C are graphs illustrating the response of $I_{LPEAK}(avg)$ that can be obtained using transfer function circuit 120. Waveforms 320 and 330 show $I_{LPEAK}(avg)$ for two cases, one where resistor 280 has a substantially zero value (FIG. 4B) and the other a non-zero value (FIG. 4C). Waveform 320 shows that the value of $I_{LPEAK}(avg)$ experiences a sharp increase when an update signal is applied at time $t_4$. On the other hand, waveform 330 in FIG. 4C shows a relatively small change in the value of $I_{LPEAK}(avg)$ in response to the update signal at time $t_4$ in proportion to the value of resistor 280). Increasing the value of resistor 280 reduces the magnitude of the response steps, thereby increasing both the averaging effect and stability of circuit 100. Increasing the value of resistor 280 also allows the size of capacitor 270 to be reduced.

Waveform 330 also shows repeatedly updated values of $I_{LPEAK}(avg)$ in response to multiple applications of update signals at times $t_4$–$t_{10}$. This allows for substantially exponential settling characteristics that closely follow classic control theory, making compensation and response analysis relatively simple.

Figure 5:
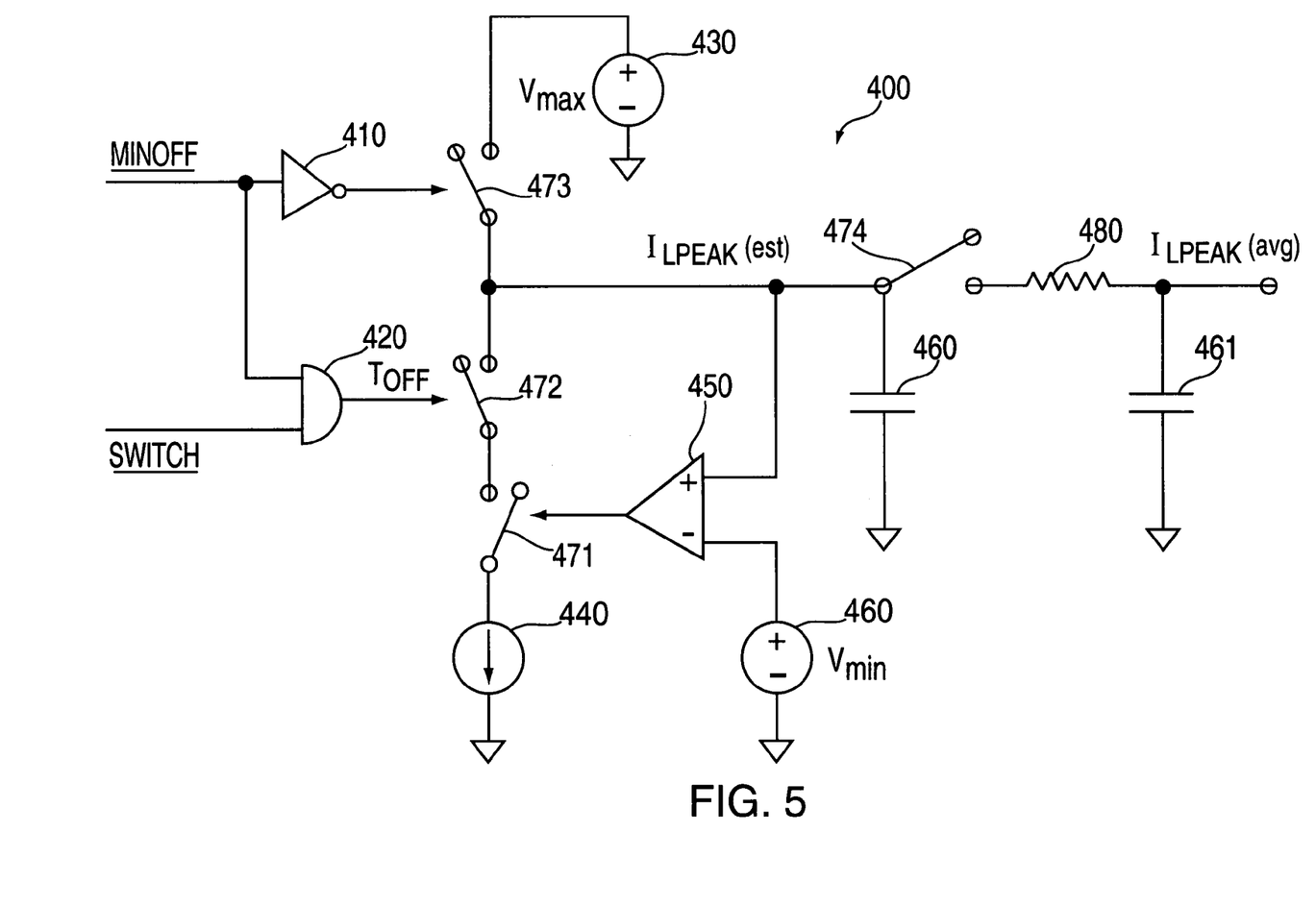
FIG. 5 is a schematic representation of another possible specific implementation of the current control circuit shown in FIG. 1.

Another possible embodiment of the present invention is shown in FIG. 5. As shown, current control circuit 400 includes an inverter 410, an AND gate 420, voltage sources 430 and 460, a substantially constant current source 440, a current comparator 450, capacitors 460 and 461, switches 471–74, and a resistor 480.

In the embodiment of FIG. 5, the peak current threshold estimate ($I_{LPEAK}(est)$) may be defined to be proportional to the voltage on capacitor 460, and the peak current threshold average may be defined to be proportional to a voltage ($I_{LPEAK}(avg)$) on capacitor 461.

Current control circuit 400 operates as follows. Source 430 supplies a maximum control voltage, Vmax, to capacitor 460 whenever switch 473 closes in response to a $\overline{MINOFF}$ signal (applied through inverter 410). The MINOFF and SWITCH signals (which may be derived from $T_{DUTY}$) are processed at AND gate 420 to generate a $T_{OFF}$ signal. When switch 472 closes in response to a $T_{OFF}$ signal, and switch 471 is closed by a signal from current comparator 450, current source 440 linearly discharges the voltage on capacitor 460. When the voltage at the non-inverting terminal of current comparator 450 falls below $V_{min}$, switch 471 opens, and $I_{LPEAK}(est)$ is present on capacitor 460.

Next, switch 474 is closed, and circuit 400 averages $I_{LPEAK}(est)$ across the capacitor divider formed by resistor 480, and capacitors 460 and 461, to generate a peak current threshold average, $I_{LPEAK}(avg)$. $I_{LPEAK}(avg)$ may be used as the peak current threshold to control the switching regulator's ON-OFF timing.

In circuit 400, the voltage on capacitor 460 is preferably not allowed to fall below a certain minimum value, $V_{min}$, established by voltage source 460. Typically, when the voltage on capacitor 460 is greater than $V_{min}$, current comparator 450 closes switch 471 enabling current source 440 to pull $I_{LPEAK}(est)$ further down. This feature establishes a minimum value for the peak current threshold estimate and prevents a switching regulator from running at high frequencies with low output current. Thus, when a regulator employing control circuit 400 supplies a low output current, each switch cycle supplies a fixed minimum current proportional to $V_{min}$.

Under these conditions (i.e., with a fixed minimum current), output regulation can be maintained by allowing switch frequency to decrease (i.e., by keeping the switch OFF for longer intervals of time). Allowing the switch frequency to decrease, however, also decreases the power conversion efficiency of the regulator. One reason this occurs is because of the dissipation of charge stored in the gate terminals of control circuitry during a long OFF interval. At low output currents, operating the regulator for short intervals of time in response to falling current can be more efficient than allowing switch frequency decrease indefinitely.

In addition to maintaining a minimum peak current threshold in circuit 400, current comparator 450 may also be configured to change states during low load intervals after a delay determined by current source 440 and capacitor 460 to improve regulator efficiency. This also aids in maintaining gate charge. An embodiment of the present invention may employ this type of comparator to periodically initiate a short interval of switch cycles to maintain the gate charge rather than allowing switch frequency decrease indefinitely.

Figure 6:
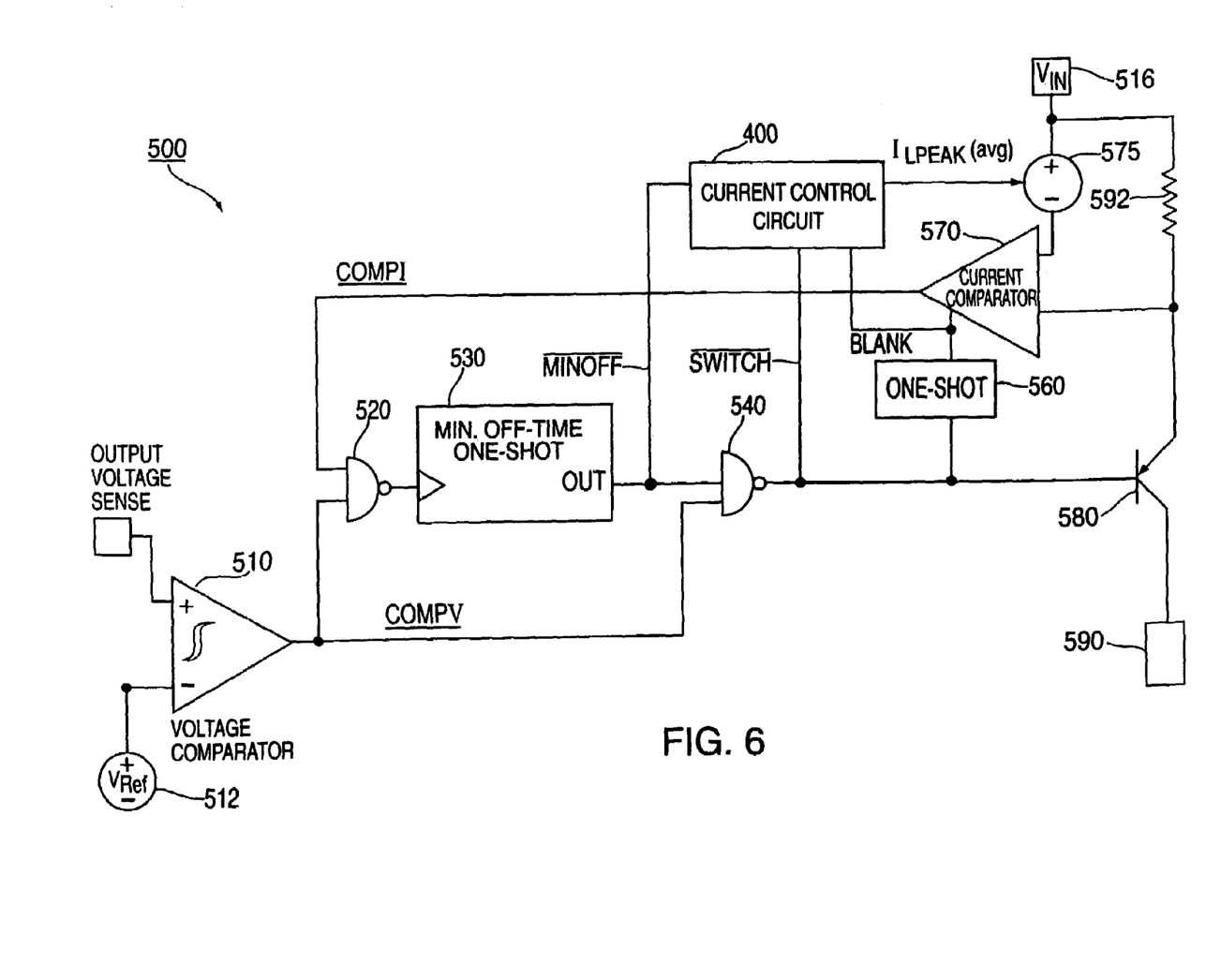
FIG. 6 is a schematic diagram of a current mode switching regulator employing the control circuit of FIG. 5.

FIG. 6 is an illustrative schematic diagram of a switching regulator circuit 500 constructed in accordance with the present invention using current control circuit 400 to generate peak threshold current values derived from time based sampling of output current. Although regulator 500 uses a minimum switch OFF-time architecture, other architectures may be used if desired.

Circuit 500 includes switch 580, pin 590, output sense resistor 592, NAND gates 520 and 540, one-shots 530 and 560, voltage comparator 510, current comparator 570, input voltage pin 516, and variable voltage source 575.

Figure 7:
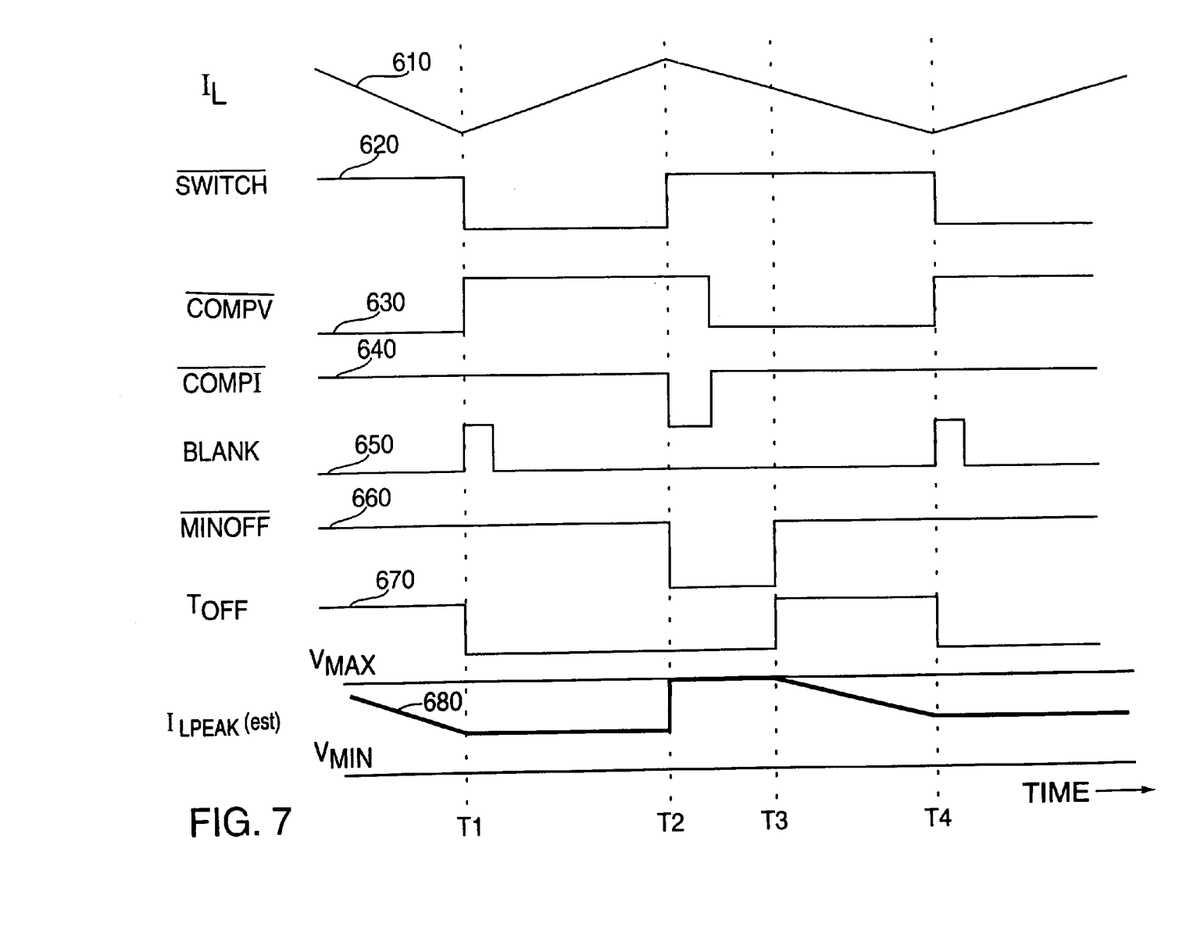
FIG. 7 is a timing diagram illustrating the variation of load current, peak current threshold, and various control signals with respect to time.

The operation of switching regulator 500 may be understood by considering the timing diagram of FIG. 7 in conjunction with the schematic of FIG. 6. FIG. 7 shows waveforms for load current 610, control signals SWITCH 620, COMPV 630, COMPI 640, BLANK 650, MINOFF 660, $T_{OFF}$ 670, and peak current threshold estimate, $I_{LPEAK}$(est) 680.

In operation, the output of regulator 500 is created from an input voltage source coupled to pin 516 ($V_{IN}$). Comparator 510 generates a COMPV signal 630 when the output voltage of the regulator, which is sensed at the non-inverting terminal of comparator 510, rises above the value of a reference voltage 512 ($V_{REF}$) coupled to the inverting terminal. The rising edge of the COMPV signal 630 (acting through NAND gate 520 and one-shot 530) causes NAND gate 540 to generate a SWITCH signal 620 which turns switch 580 ON. Switch 580 remains ON until the output current measured by resistor 592 is greater than or equal to that of voltage source 575. FIG. 7 shows the rising edges of the COMPV signal 630 during intervals T1 and T4, and also shows the SWITCH signal 620 becoming a logic low, which turns ON switch 580.

While switch 580 is ON, current is delivered through switch 580 to pin 590. In some implementations, an inductor may be coupled to pin 590 (not shown) to facilitate voltage regulation. The current passing through switch 580 is monitored by measuring a voltage drop across sense resistor 592. This voltage drop is compared with a threshold voltage generated by source 575 (which is proportional to the average peak current limit, $I_{LPEAK}$(avg)) with current comparator 570. The result of this comparison is provided to NAND gate 520 as an indication of switch current.

Viewing the $I_{LPEAK}$(avg) 680 waveform in FIG. 7 and progressing forward in time from T1, it can be seen that load current 610 ($I_L$) delivered through pin 590 rises from a minimum at T1 until T2 at which point the switch current exceeds $I_{LPEAK}$(avg).

When the switch current exceeds $I_{LPEAK}$(avg), comparator 570 trips and generates a COMPI signal 640 that causes one-shot 530 to generate a logic low MINOFF signal 660, that turns switch 580 OFF. Switch 580 remains OFF for a period of time determined by the output voltage but has a preset minimum delay value determined by settings on one-shot 530.

The output of regulator 500 is regulated by using control circuit 400 to adjust each switch cycle with respect to the peak current threshold ($I_{LPEAK}$(avg)) at which switch 580 is turned OFF. Circuit 400, as described above, generates a substantially linear transfer function relating peak current thresholds to time. When the MINOFF signal turns switch 580 OFF, it also causes circuit 400 to reset peak current threshold estimate $I_{LPEAK}$(est) to its maximum value.

Regulator 500 obtains an updated value of $I_{LPEAK}$(avg) for each switch cycle, using a BLANK signal 650 generated by one-shot 560. One-shot 560 generates BLANK signal 650 in response to a rising edge of SWITCH signal 620 that follows the beginning of a switch cycle. This is shown, for example, in FIG. 7, where BLANK signal 650 is a logic high at T1 and T4 corresponding to the rising edges of SWITCH signal 620. The BLANK signal causes circuit 400 to update values of $I_{LPEAK}$(avg) by sampling the peak current threshold estimate, $I_{LPEAK}$(est), across the capacitive divider circuit shown in FIG. 5. Using values of $I_{LPEAK}$(avg) regulator 500 is able to regulate output voltage without using an error amplifier. This is a significant improvement over prior art regulators for many reasons. Chief among these is the reduction in regulator quiescent current and elimination of an input pin for the error amplifier.

In switching regulator 500, time constants for the settling of peak current threshold values to asymptotic values in response to load steps are, as described earlier, primarily determined by the values of capacitors 460 and 461, the value of resistor 482, and the pulse width of the "updating" BLANK signal. When capacitors 460 and 461 are comparable in size, time constants yielding an exponentially smooth rise in load current in response to a load step are obtained.

Figure 8:
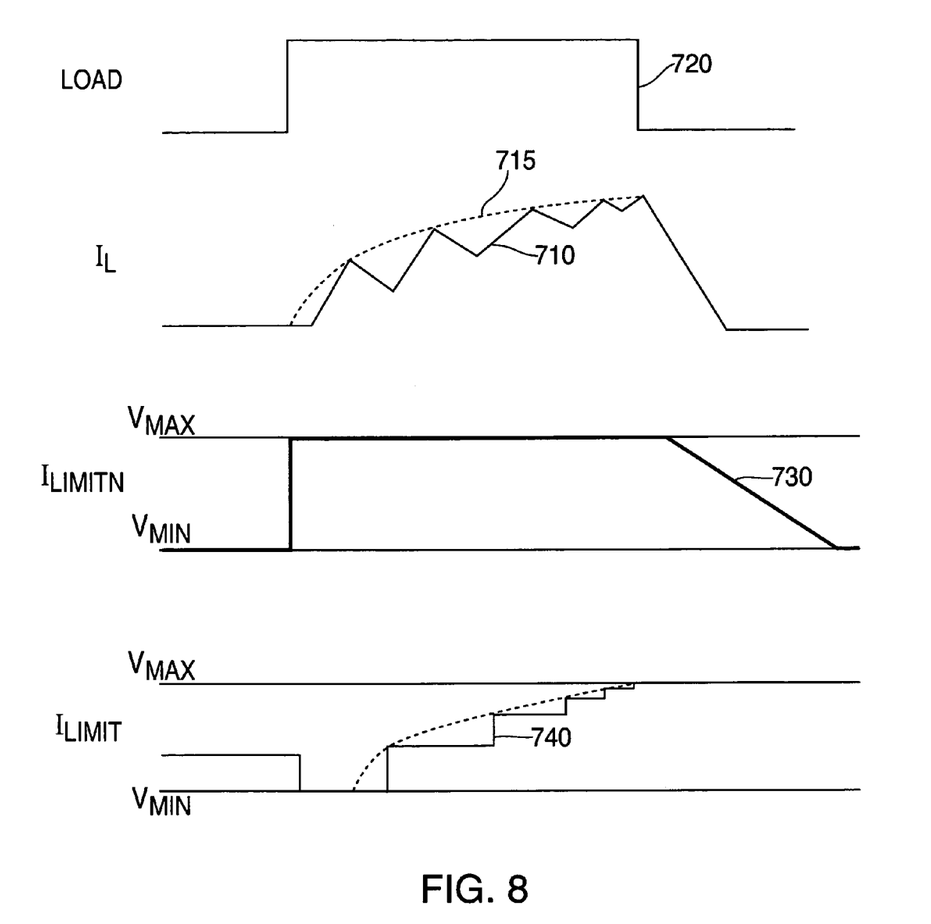
FIG. 8 is a timing diagram illustrating the response of the circuits of FIGS. 3 and 5 to a load step.

In FIG. 8, waveform 720 is a graphical depiction a load step placed on the input of regulator 500. Dotted line 715 above the of load current waveform 710 ($I_L$) illustrates the exponentially smooth pulse response of regulator 500 achieved using the current control circuit of the present invention. Waveform 730 depicts the corresponding shape (i.e., the transfer function) of the peak current threshold estimate $I_{LPEAK}$(est) generated by circuit 400. Waveform 740 shows the peak current threshold average $I_{LPEAK}$(avg) as updated by BLANK signals during the load step.

In addition to the mode of current regulation described above, switching regulator 500 may be operated in a low output power mode in which switch 580 turns ON and OFF for short intervals of time rather than allowing switch frequency decrease indefinitely. In this mode, the COMPV signal may be used to override current-mode regulation and define certain time intervals for turning switch 580 ON and OFF.

For example, voltage comparator 510 may include switchable hysteresis feature that can be used to set time intervals in the COMPV signal to control switch 580. The hysteresis may be switched in at certain appropriate times such as when low loads are sensed by measurement of a long $T_{OFF}$ period (indicative of low switch frequencies) or when the peak current thresholds as estimated or averaged fall below a minimum voltage such as Vmin, set by source 460 (FIG. 5). During low output power operation, peak current thresholds $I_{LPEAK}$(est) and $I_{LPEAK}$(avg) can be optionally reduced or fixed at Vmin if desired.

Persons skilled in the art will appreciate that the present invention can be practiced by other than the described embodiments, which are presented for purposes of illustration and not of limitation, and the present invention is limited only by the claims which follow.

What is claimed is:

1. In a switching voltage regulator having an output switch that provides an output current at a regulated voltage, a method for regulating the output voltage comprising:
determining a value of the output current by measuring a switching period of the output switch; and adjusting a current limit point of the regulator with respect to the output current value so that regulated output voltage is maintained substantially constant.

2. The method of claim 1 wherein the determining further comprises using the switching period to generate at least one estimate of the output current.

3. The method of claim 1 wherein the switching voltage regulator is a current-mode switching voltage regulator.

4. The method of claim 1 further comprising:
comparing a signal related to the output current with the current limit point; and
controlling the output switch responsive to the comparing step.

5. In a switching voltage regulator having an output switch that provides an output current at a regulated voltage, a method for regulating the output voltage comprising:
determining a value of the output current by measuring a switching period of the output switch; and
adjusting a current limit point of the regulator with respect to the output current value so that regulated output voltage is maintained substantially constant, wherein the determining further comprises using the switching period to generate a plurality of estimates of the output current such that each estimate is indicative of the output current provided by the voltage regulator at a different point in time.

6. The method of claim 5 wherein the determining further comprises generating the plurality of output current estimates such that the output current estimates are substantially linearly related to the switching period.

7. The method of claim 5 wherein the determining further comprises generating the plurality of output current estimates such that at least one of the output current estimates is substantially exponentially related to the switching period.

8. The method of claim 5 wherein the determining further comprises generating the plurality of output current estimates such that the output current estimates are substantially related to the switching period to obtain a particular transfer function.

9. The method of claim 8 further comprising choosing a particular transfer function to improve at least one performance characteristic of the voltage regulator.

10. The method of claim 5 wherein the determining further comprises averaging at least some of the output current measurements to obtain a time-based average value of said output current.

11. The method of claim 10 wherein the adjusting further comprises using the time-based average current value to produce a threshold indicative of the current limit.

12. The method of claim 11 wherein the determining further comprises:
storing said time-based average value of the output current;
generating an estimate of the regulator output current indicative of an output current presently provided by the regulator; and
averaging the present output current estimate and the time-based average of the output current to produce an updated time-based average of the output current.

13. The method of claim 11 wherein the adjusting further comprises using the updated time-based average to provide an updated threshold indicative of the current limit.

14. The method of claim 12 wherein the determining further comprises storing the updated time-based average for use in subsequent averaging steps.

15. In a switching voltage regulator having an output switch that provides an output current at a regulated voltage, a method for regulating the output voltage comprising:
estimating a value of the output current based on a switching period of the output switch, the estimating further comprising:
charging a capacitive element to a predetermined initial condition;
discharging the capacitive element at a predetermined rate;
ceasing the discharging at a point where the remaining charge on the capacitive element is proportional to the output current; and
adjusting a current limit of the regulator with respect to the estimated output current value so that regulated output voltage is maintained substantially constant.

16. The method of claim 15 wherein the ceasing further comprises discharging the capacitive element for a time substantially equal to the time that the output switch is maintained OFF during a switching cycle.

17. The method of claim 15 wherein the ceasing further comprises discharging the capacitive element for a time substantially equal to the time the output switch is maintained ON during a switching cycle.

18. The method of claim 15 wherein the estimating further comprises generating a plurality of estimates of the output current such that each estimate is indicative of the output current provided by the voltage regulator at a different point in time.

19. The method of claim 18 wherein the estimating further comprises averaging at least some of the output current measurements to obtain a time-based average value of said output current.

20. The method of claim 19 wherein the adjusting further comprises using the time-based average current value to produce a threshold indicative of the current limit.

21. The method of claim 20 wherein the determining further comprises:
storing said time-based average value of the output current;
generating an estimate of the regulator output current indicative of an output current presently provided by the regulator; and
averaging the present output current estimate and the time-based average of the output current to produce an updated time-based average of the output current.

22. The method of claim 21 wherein the adjusting further comprises using the updated time-based average to provide an updated threshold indicative of the current limit.

23. A control circuit for use with a current mode switching regulator that provides a regulated output voltage to a load, the control circuit comprising:
a current estimation circuit that provides a time-based estimate of regulator output current by measuring a switching period of the output switch; and
a circuit for adjusting a current limit point of the regulator with respect to the time-based estimate of regulator output current so that the regulated output voltage is maintained substantially constant.

24. The control circuit of claim 23 wherein the estimation circuit comprises at least one capacitive element.

25. The control circuit of claim 24 wherein the estimation circuit further comprises a voltage source coupled to the at least one capacitive element for charging the at least one capacitive element to a predetermined initial condition.

26. The control circuit of claim 25 wherein the estimation circuit further comprises a switching element for selectively charging the at least one capacitive element to the initial condition.

27. The control circuit of claim 26 wherein the control circuit further comprises a transfer function circuit.

28. The control circuit of claim 27 wherein the transfer function circuit comprises circuitry for linearly relating output current estimates to a switching period of the regulator.

29. The control circuit of claim 27 wherein the transfer function circuit comprises circuitry for exponentially relating output current estimates to a switching period of the regulator.

30. The control circuit of claim 27 wherein the transfer function circuit further comprises:
   at least one capacitive element; and
   a switching element for selectively coupling the at least one capacitive element of the current estimation circuit to the at least one capacitive element of the transfer function circuit to obtain an average value of a plurality of current estimates generated by the current estimation circuit.

31. A control circuit for use with a current mode switching regulator that provides a regulated output voltage to a load, the control circuit comprising:
   a current estimation circuit that provides a time-based estimate of regulator output current by measuring a switching period of the output switch, wherein the estimation circuit comprises:
   at least one capacitive element,
   a voltage source coupled to the at least one capacitive element for charging the at least one capacitive element to a predetermined initial condition, and
   a current source coupled to the at least one capacitive element for discharging the at least one capacitive element at a predetermined rate for a period of time such that the charge remaining on the at least one capacitive element is proportional to the output current of the regulator; and
   a circuit for adjusting a current limit point of the regulator with respect to the time-based estimate of regulator output current so that the regulated output voltage is maintained substantially constant.

* * * * *